(12) United States Patent
Huang

(10) Patent No.: US 11,178,324 B2
(45) Date of Patent: Nov. 16, 2021

(54) FOCUSING METHOD AND DEVICE, ELECTRONIC DEVICE AND COMPUTER-READABLE STORAGE MEDIUM

(71) Applicant: GUANGDONG OPPO MOBILE TELECOMMUNICATIONS CORP., LTD., Guangdong (CN)

(72) Inventor: Haidong Huang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/842,471

(22) Filed: Apr. 7, 2020

(65) Prior Publication Data
US 2020/0412937 A1    Dec. 31, 2020

(30) Foreign Application Priority Data
Jun. 28, 2019  (CN) .......................... 201910571894.2

(51) Int. Cl.
*H04N 5/232*  (2006.01)

(52) U.S. Cl.
CPC ..... *H04N 5/23212* (2013.01); *H04N 5/23219* (2013.01)

(58) Field of Classification Search
CPC ........... H04N 5/23212; H04N 5/23219; H04N 5/23218; H04N 5/23225; H04N 5/232127
See application file for complete search history.

(56) References Cited

U.S. PATENT DOCUMENTS

| 8,593,534 B2 | 11/2013 | Gardiner et al. |
| 2008/0199056 A1* | 8/2008 | Tokuse ............... H04N 5/23212 382/118 |
| 2010/0045800 A1* | 2/2010 | Chebil ............... H04N 5/23212 348/169 |
| 2010/0189427 A1 | 7/2010 | Ilya et al. |

(Continued)

FOREIGN PATENT DOCUMENTS

| CN | 1973231 | 5/2007 |
| CN | 103679744 A | 3/2014 |

(Continued)

OTHER PUBLICATIONS

SIPO, First Office Action for CN201910571894.2, dated Aug. 27, 2020.

(Continued)

*Primary Examiner* — Gevell V Selby
(74) *Attorney, Agent, or Firm* — Hodgson Russ LLP

(57) ABSTRACT

A focusing method includes: acquiring an image of a current frame; and performing auto focusing by using a target area in an image of a previous frame as a focusing area in the image of the current frame, the image of the previous frame is an image of a preceding frame adjacent to the current frame, the target area in the image of the previous frame is an area where a target subject is located, the target subject is obtained by inputting the image of the previous frame into a subject detection model and performing subject detection, and the subject detection model is a model trained in advance based on at least visible light images, center weight maps and corresponding labeled subjects for a same scene.

11 Claims, 7 Drawing Sheets

(56) References Cited

U.S. PATENT DOCUMENTS

| | | | | |
|---|---|---|---|---|
| 2012/0218456 A1* | 8/2012 | Sweet, III | ........ | H04N 5/232127 |
| | | | | 348/345 |
| 2012/0242886 A1* | 9/2012 | Kawarada | ........ | H04N 5/232123 |
| | | | | 348/345 |
| 2015/0055006 A1* | 2/2015 | Kim | .................... | H04N 5/23293 |
| | | | | 348/333.11 |
| 2015/0055824 A1* | 2/2015 | Hong | .................... | G06K 9/4652 |
| | | | | 382/103 |
| 2015/0237262 A1* | 8/2015 | Hamada | ............... | H04N 5/2353 |
| | | | | 348/333.11 |
| 2016/0073004 A1 | 3/2016 | Nakano et al. | | |
| 2018/0278737 A1 | 9/2018 | Posa | | |

FOREIGN PATENT DOCUMENTS

| CN | 103679756 A | 3/2014 |
|---|---|---|
| CN | 104463878 | 3/2015 |
| CN | 106127733 A | 11/2016 |
| CN | 205883405 | 1/2017 |
| CN | 104469167 | 10/2017 |
| CN | 107301864 | 10/2017 |
| CN | 106686308 | 2/2018 |
| CN | 107682740 A | 2/2018 |
| CN | 107948514 | 4/2018 |
| CN | 108024065 A | 5/2018 |
| CN | 108170817 | 6/2018 |
| CN | 108229425 A | 6/2018 |
| CN | 108337471 A | 7/2018 |
| CN | 108900778 | 11/2018 |
| CN | 109089047 | 12/2018 |
| CN | 105847664 | 1/2019 |
| CN | 109167910 | 1/2019 |
| CN | 109525786 A | 3/2019 |
| CN | 109684925 | 4/2019 |
| CN | 109792478 A | 5/2019 |
| CN | 110248096 A | 9/2019 |

OTHER PUBLICATIONS

EPO, Extended European Search Report for EP20174739.1, dated Oct. 15, 2020.

WIPO, ISR for International Application PCT/CN2020/094463, Aug. 26, 2020.

SIPO, Notice of Allowance for CN Application No. 201910571894.2, dated Dec. 18, 2020.

* cited by examiner

FOCUSING METHOD AND DEVICE, ELECTRONIC DEVICE AND COMPUTER-READABLE STORAGE MEDIUM

CROSS-REFERENCE TO RELATED APPLICATION

This application claims priority to Chinese Patent Application No. 201910571894.2, filed on Jun. 28, 2019, the entire disclosure of which is incorporated herein by reference.

TECHNICAL FIELD

The present disclosure relates to the field of image, and in particular, to a focusing method and device, an electronic device, and a computer-readable storage medium.

BACKGROUND

With the development of image technologies, people are more and more accustomed to taking images or videos through image acquisition devices such as a camera on an electronic device to record various information. The camera automatically selects a focus point to perform focusing during a process of image acquisition. In conventional focusing methods, a size and range of a given view-finder is relatively fixed, and when the view-finder is affected by interference, accuracy of the focusing will be low.

This section provides background information related to the present disclosure which is not necessarily prior art.

SUMMARY

In embodiments of the present disclosure, there are provided a focusing method and device, an electronic device, and a computer-readable storage medium which are capable of improving accuracy of focusing.

According to a first aspect of the present disclosure, there is provided a focusing method including:
  acquiring an image of a current frame; and
  performing auto focusing by using a target area in an image of a previous frame as a focusing area in the image of the current frame,
  the image of the previous frame is an image of a preceding frame adjacent to the current frame, the target area in the image of the previous frame is an area where a target subject is located, the target subject is obtained by inputting the image of the previous frame into a subject detection model and performing subject detection, and the subject detection model is a model trained in advance based on at least visible light images, center weight maps and corresponding labeled subjects for a same scene.

According to a second aspect of the present disclosure, there is provided a focusing device including:
  acquisition module configured to acquire an image of a current frame; and
  focusing module configured to perform auto focusing by using a target area in an image of a previous frame as a focusing area of the image of the current frame,
  wherein the image of the previous frame is an image of a preceding frame adjacent to the current frame, the target area in the image of the previous frame is an area where a target subject is located, the target subject is obtained by inputting the image of the previous frame into a subject detection model and performing subject detection, and the subject detection model is a model trained in advance based on at least visible light images, center weight maps and corresponding labeled subjects for a same scene.

According to a third aspect of the present disclosure, there is provided an electronic device including a memory and a processor, the memory storing instructions that, when executed by the processor, cause the processor to perform a focusing method, the method including:
  acquiring an image of a current frame; and
  performing auto focusing by using a target area in an image of a previous frame as a focusing area in the image of the current frame,
  the image of the previous frame is an image of a preceding frame adjacent to the current frame, the target area in the image of the previous frame is an area where a target subject is located, the target subject is obtained by inputting the image of the previous frame into a subject detection model and performing subject detection, and the subject detection model is a model trained in advance based on at least visible light images, center weight maps and corresponding labeled subjects for a same scene.

According to a fourth aspect of the present disclosure, there is provided a non-volatile computer-readable storage medium which stores thereon computer program that, when executed by a processor, causes the processor to perform a focusing method, the method including:
  acquiring an image of a current frame; and
  performing auto focusing by using a target area in an image of a previous frame as a focusing area in the image of the current frame,
  the image of the previous frame is an image of a preceding frame adjacent to the current frame, the target area in the image of the previous frame is an area where a target subject is located, the target subject is obtained by inputting the image of the previous frame into a subject detection model and performing subject detection, and the subject detection model is a model trained in advance based on at least visible light images, center weight maps and corresponding labeled subjects for a same scene.

In the focusing method and device, the electronic device, and the computer-readable storage medium according to the embodiments of the present disclosure, an image of a current frame is acquired, and auto focusing is performed by using a target area in an image of a previous frame corresponding to a target subject which is obtained by performing subject detection on the image of the previous frame, as a focusing area in the image of the current frame, which enables to accurately determine the focusing area in the image of the current frame and avoid inaccurate focusing caused in a case that there is interference such as too bright ambient light.

This section provides a summary of various implementations or examples of the technology described in the disclosure, and is not a comprehensive disclosure of the full scope or all features of the disclosed technology.

BRIEF DESCRIPTION OF THE DRAWINGS

To make the technical solutions in embodiments of the present disclosure or the prior art more clear, the accompanying drawings which are referred to in the description of the embodiments or the prior art will be briefly described below. Obviously, the drawings in the following description show merely some embodiments of the present disclosure, and a person of ordinary skill in the art may still derive other drawings from these accompanying drawings without creative efforts.

DETAILED DESCRIPTION

In order to make the purposes, technical solutions, and advantages of the present disclosure more clear, the present disclosure will be described in detail below with reference to the drawings and embodiments. It should be understood that the specific embodiments described herein are only used to explain the present disclosure, and are not intended to limit the present disclosure.

A focusing method in embodiments of the present disclosure can be applied to an electronic device. The electronic device can be a computer device, a personal digital assistant, a tablet computer, a smart phone, a wearable device, or the like which has a camera. When capturing an image, the camera in the electronic device will perform auto focusing to capture clear images.

Figure 1:
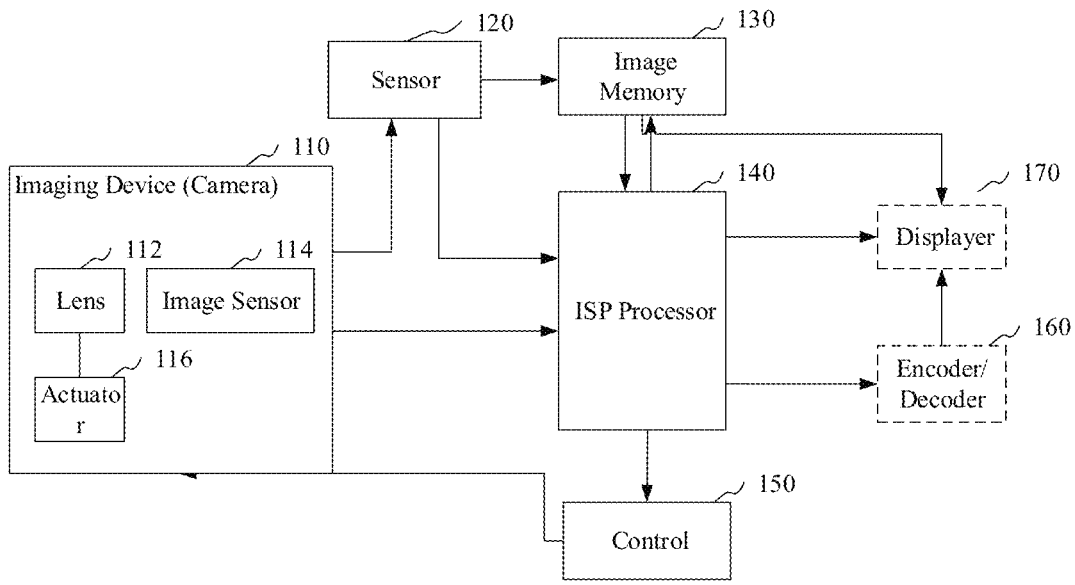
FIG. 1 is a block diagram of an internal structure of an electronic device in an embodiment.

In an embodiment, the electronic device may include an image processing circuit. The image processing circuit may be implemented in hardware and/or software components, and may include various processing units that define an Image Signal Processing (ISP) pipeline. FIG. 1 is a schematic diagram of an image processing circuit in an embodiment. As shown in FIG. 1, only aspects of image processing technologies involved in the embodiments of the present disclosure are shown for ease of description.

As shown in FIG. 1, the image processing circuit includes an ISP processor 140 and a control logic 150. Image data captured by the imaging device 110 is firstly processed by the ISP processor 140 which analyzes the image data to capture image statistical data that can be used to determine one or more control parameters of the imaging device 110 and/or the ISP processor 140. The imaging device 110 can include a camera having one or more lenses 112, an image sensor 114, and an actuator 116. The actuator 116 can drive the lenses 112 to move. The image sensor 114 can include an array of color filters (such as a Bayer filter), and can obtain light intensity and wavelength information captured by each of imaging pixels of the image sensor 114, and provide a set of original image data that can be processed by the ISP processor 140. The sensor 120, such as a gyroscope, can provide obtained parameters such as image stabilization parameters of the image processing to the ISP processor 140 based on a type of an interface of the sensor 120. The interface of the sensor 120 may include a Standard Mobile Imaging Architecture (SMIA) interface, other serial or parallel camera interfaces, or a combination of the foregoing interfaces.

In addition, the image sensor 114 can also send the original image data to the sensor 120 which may provide the original image data to the ISP processor 140 based on the type of the interface of the sensor 120, or store the original image data in an image memory 130.

The ISP processor 140 processes the original image data pixel by pixel in a variety of formats. For example, each of the image pixels may have a bit depth of 8, 10, 12, or 14 bits, and the ISP processor 140 can perform one or more image processing operations on the original image data and gather statistical information of the image data. The image processing operations may be performed in same or different precisions of the bit depth.

The ISP processor 140 can also receive image data from the image memory 130. For example, the interface of the sensor 120 sends the original image data to the image memory 130, and the original image data in the image memory 130 is then provided to the ISP processor 140 for processing. The image memory 130 may be a part of a memory device, a storage device, or a separate dedicated memory in an electronic device, and may include Direct Memory Access (DMA) characteristics.

When receiving the original image data from the interface of the image sensor 114, the interface of the sensor 120 or the image memory 130, the ISP processor 140 can perform one or more image processing operations, such as time-domain filtering. The processed image data can be sent to the image memory 130 for further processing before being displayed. The ISP processor 140 receives the data for processing from the image memory 130 and performs image data processing on the data in an original domain and in RGB and YCbCr color spaces. The image data processed by the ISP processor 140 can be output to a display 170 to be viewed by a user and/or to be further processed by a graphics engine or a Graphics Processing Unit (GPU). In addition, the output of the ISP processor 140 can also be sent to the image memory 130 from which the display 170 can read the image data. In an embodiment, the image memory 130 may be configured to implement one or more frame buffers. In addition, the output of the ISP processor 140 can be sent to an encoder/decoder 160 so as to encode/decode the image data. The encoded image data can be saved, and decompressed before being displayed on the display 170. The encoder/decoder 160 may be implemented by a CPU, a GPU or a co-processor.

The statistical data determined by the ISP processor 140 can be sent to the control logic 150. For example, the statistical data may include statistical information of the image sensor 114 such as auto exposure, auto white balance, auto focusing, flicker detection, black level compensation, and shading correction of the lens 112. The control logic 150 may include a processor and/or a microcontroller that executes one or more routines such as firmware which can determine the control parameters of the imaging device 110 and of the ISP processor 140 based on the received statistical data. For example, the control parameters of the imaging device 110 may include control parameters of the sensor 120 (e.g., a gain, an integration time for exposure control, image stabilization parameters, etc.), control parameters of the camera flash, control parameters of the lens 112 (e.g., a focal length for focusing or zooming), or a combination of such parameters. The control logic 150 may output the control parameters of the lenses 112 to the actuator 116 which drives the lens 112 to move based on the control parameters. ISP control parameters may include a gain level and color correction matrix for automatic white balance and color adjustment (e.g., during RGB processing), and shading correction parameters of the lens 112.

Figure 2:
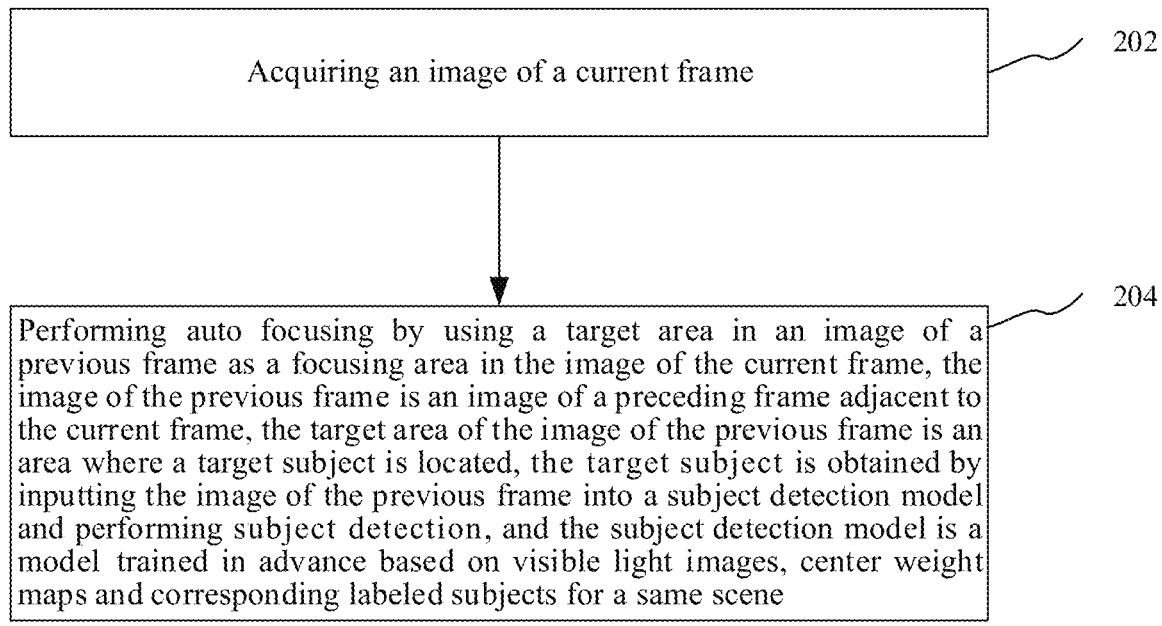
FIG. 2 is a flowchart of a focusing method in an embodiment.

FIG. 2 is a flowchart of a focusing method according to an embodiment. As shown in FIG. 2, a focusing method which can be applied to the electronic device shown in FIG. 1 includes the following steps.

In step 202, an image of a current frame is acquired.

The image of the current frame can be a visible light image. During the focusing process of the imaging device of the electronic device, a plurality of frames of images can be captured at a preset frame rate so as to perform focusing. The preset frame rate may be 10 frames, 20 frames, 30 frames, etc., and is not limited thereto.

In step 204, auto focusing is performed by using a target area in an image of a previous frame as a focusing area in the image of the current frame, where the image of the previous frame is an image of a preceding frame adjacent to the current frame, the target area in the image of the previous frame is an area where a target subject is located, the target subject is obtained by inputting the image of the previous frame into a subject detection model and performing subject detection, and the subject detection model is a model trained in advance based on at least visible light images, center weight maps and corresponding labeled subjects for a same scene.

The subject detection model is trained in advance based on the visible light images, the center weight maps and the corresponding labeled subjects for the same scene, or trained in advance based on the visible light images, the center weight maps, depth maps, and the corresponding labeled subjects for the same scene.

The image of the previous frame refers to an image of a preceding frame adjacent to the current frame. The subject detection model contains a target network weight and is obtained by training a subject detection model containing an initial network weight with a large amount of training data which are collected in advance. The method of training the subject detection model containing the initial network weight to obtain the subject detection model containing the target network weight will be described in detail later.

A plurality of sets of training data can be collected in advance. In an embodiment, each set of training data includes a visible light image, a center weight map, and a labeled subject, which are corresponding to the same scene. The labeled subject can be in a form of a subject mask image. The visible light image is used as an input of the subject detection model under training, and the labeled subject mask image is used as a truth of an expected output from the subject detection model under training. The subject mask image is an image filter template for recognizing a subject in the image, which can mask other parts of the image and filter the subject from the image. The subject detection model can be trained to recognize and detect various subjects, such as people, flowers, cats, dogs, backgrounds, and so on. In another embodiment, each set of the training data includes the visible light image, the center weight map, a depth map and the labeled subject which are corresponding to the same scene.

Specifically, the image of the previous frame can be input, by the electronic device, into the subject detection model for detection, and a subject area confidence map can be obtained. Based on the subject area confidence map, the target subject in the image of the previous frame can be determined. The subject area confidence map records probabilities that the subject belongs to categories of recognizable subjects. For example, a pixel point has a probability of 0.8 of belonging to a person, a probability of 0.1 of belonging to a flower, and a probability of 0.1 of belonging to a background. The subject with a largest confidence can be selected as the recognized subject. The subject can be any of recognizable targets which are pre-configured. The targets may be human, objects, animals, or the like. The objects may include flowers, mountains, trees, and so on. The animals may include cats, dogs, cattle, sheep, tigers, and so on.

The electronic device determines the target area of the target subject in the image of the previous frame based on the target subject detected by the subject detection model. The target area can be labeled with a rectangular frame, a mask image, or the like.

Specifically, the electronic device compares the image of the current frame with the image of the previous frame, and determines a target area in the image of the current frame corresponding to the target area where the target subject is located in the image of the previous frame. Usually, there will not be substantial change in positions of the subject in two adjacent frames of images. By comparing horizontal and vertical coordinates of the two frames of images, the target area of the target subject in the image of the current frame can be determined. In order to capture a clear image, the imaging device 110 of the electronic device will first perform auto focusing. There are many ways to perform the auto focusing, such as Phase Detection Auto Focusing (PDAF), Time of Flight Auto Focusing (TOFAF), Contrast Auto Focusing (CAF), etc. In the PDAF, a phase difference is obtained through the sensor, a defocus value is calculated based on the phase difference, and the lens is controlled to move based on the defocus value to find a Focus Value (FV) peak. In the TOFAF, the auto focusing is achieved by emitting infrared light to a target, obtaining depth of field data, and performing focusing based on the depth of field data. In the CAF, the FV peak is calculated based on a gyro and a contrast algorithm, and the position with a largest contrast is generally the position of the FV peak.

Generally, an auto focusing process includes a coarse search in which the lens is controlled to move to a first focusing position (e.g., an approximate focusing position) in a first focusing distance and a fine search in which the lens is controlled to move to a second focusing position (e.g., an optimal focusing position) in a second focusing distance.

Figure 3:
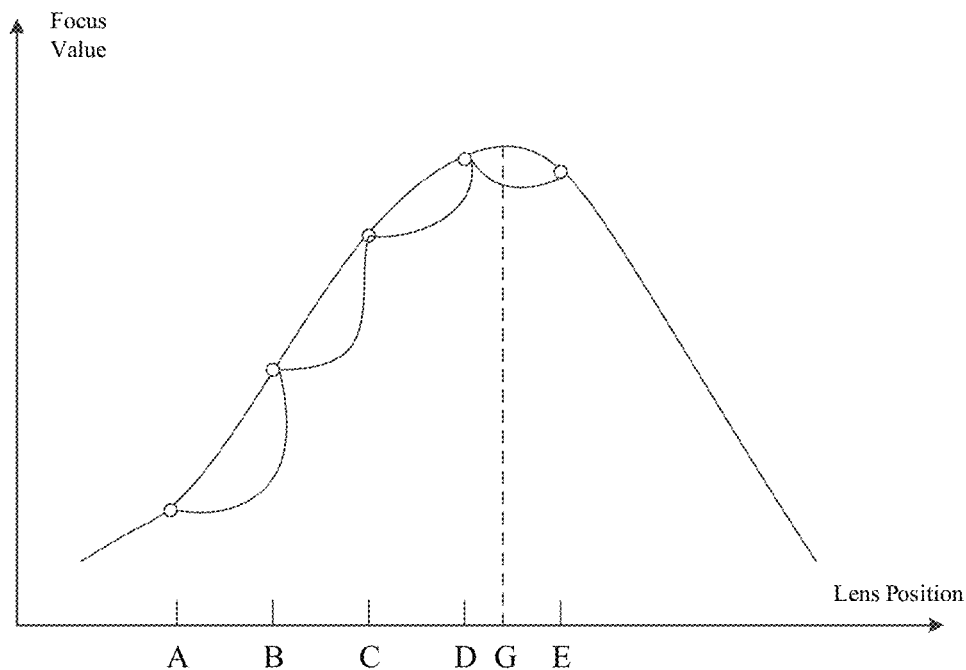
FIG. 3 is a schematic diagram of a principle of a fine search in an embodiment.

FIG. 3 is a schematic diagram of a principle of a fine search in an embodiment. As shown in FIG. 3, during the fine search, the actuator can drive the lens to move in a second focusing distance. A frame of image can be acquired after each movement of the lens, and the FV of the image can be calculated. For example, if the second focusing distance is 10, the lens can be driven to move in a step of 10 each time and perform searching. As shown in FIG. 3, during the fine search, five points A, B, C, D, and E are searched, and the FVs of the images generated at these five points are recorded respectively. During the search from point A to D, the FV gradually increases, indicating that a definition of the image becomes higher. During the search from point D to E, the FV decreases, indicating that the definition of the image becomes lower. A fitting curve can be drawn according to the FVs obtained at points A to E, and a lens position corresponding to a vertex G of the fitting curve is used as the second focus position for image capturing.

In the focusing method of this embodiment, after acquiring the image of the current frame, the target area corresponding to the target subject in the image of the previous frame obtained by performing subject detection on the image of the previous frame is used as a focusing area in the image of the current frame to perform auto focusing, which can accurately determine the focusing area in the image of the current frame, and will not cause inaccurate focusing when there is interference such as too bright ambient light.

In an embodiment, inputting the image of the previous frame into the subject detection model to obtain the target subject in the image of the previous frame includes: generating a center weight map corresponding to the image of the previous frame; and obtaining the target subject in the image of the previous frame by inputting the image of the previous frame and the center weight map into the subject detection model. The subject detection model is a model trained based on the visible light image, the center weight map, and the corresponding labeled subject.

The center weight map refers to a map which records weight values of each of the pixels in the visible light image. The weight values recorded in the center weight map gradually decreases from a center to peripheries in the center weight map, that is, the weight value is the largest at the center, and gradually decreases towards the peripheries. It is indicated by the center weight map that the weight values gradually decrease from center pixels to edge pixels of the visible light image.

The electronic device can generate a corresponding center weight map according to a size of the image of the previous frame. The weight values represented by the center weight map gradually decrease from the center to the peripheries. The center weight map can be generated by using a Gaussian function, a first-order equation, or a second-order equation. The Gaussian function may be a two-dimensional Gaussian function.

The subject detection model is obtained by training the subject detection model containing the initial network weight with a large amount of training data collected in advance. Each set of training data includes the visible light image, the center weight map and the labeled subject mask map for the same scene. The visible light image and the center weight map are used as the input to the subject detection model under training, and the labeled subject mask map is used as the ground truth of the expected output from the subject detection model under training.

In this embodiment, a subject in the center of the image is allowed to be detected more easily by using the center weight map, and the target subject in the image of the previous frame can be recognized more accurately by using the trained subject detection model which is trained by using the visible light image, the center weight map, and subject mask map.

In an embodiment, the subject detection model includes an input layer, an intermediate layer, and an output layer that are sequentially connected. The intermediate layer can be a network structure of one layer or at least two layers.

The inputting the image of the previous frame and the center weight map into the subject detection model includes: applying the image of the previous frame to the input layer of the subject detection model; and applying the center weight map to the output layer of the subject detection model.

In this embodiment, applying the center weight map to the output layer of the subject detection model can reduce the calculation of the center weight map, and by directly applying the center weight map to the output result, the accuracy of detection can be improved.

In an embodiment, inputting the image of the previous frame into the subject detection model to obtain the target subject in the image of the previous frame includes: obtaining a depth map corresponding to the image of the previous frame; generating a center weight map corresponding to the image of the previous frame; and inputting the image of the previous frame, the depth map and the center weight map into the subject detection model to obtain the target subject in the image of the previous frame. The subject detection model is a model trained in advance based on the visible light image, the depth map, the center weight map, and the corresponding labeled subject for the same scene.

The depth map refers to a map containing depth information. The corresponding depth map is obtained by shooting the same scene through a depth camera or a binocular camera. The depth camera can be a structured light camera or a Time of Flight (TOF) camera. The depth map can be at least one of a structured light depth map, a TOF depth map, and a binocular depth map.

The image of the previous frame which is a visible light image and the corresponding depth map can be obtained by shooting the same scene through the camera, and then the visible light image and the depth map are registered by using calibration parameters of the camera to obtain the registered visible light image and depth map.

In other embodiments, when the depth map cannot be captured, a simulated depth map can be automatically generated. The depth value of each of pixels in the simulated depth map can be a preset value. In addition, the depth values of the pixels in the simulated depth map may correspond to different preset values.

The subject detection model is obtained by training the subject detection model containing the initial network weight with a large amount of training data collected in advance. Each set of training data includes the visible light image, the depth map, the center weight map and the labeled subject mask map for the same scene. The visible light image and the center weight map are used as the input to the subject detection model under training, and the labeled subject mask map is used as the ground truth of the expected output from the subject detection model under training. The subject mask image is an image filter template for recognizing the subject in the image, which can mask other parts of the image and filter the subject from the image. The subject detection model can be trained to recognize and detect various subjects, such as people, flowers, cats, dogs, backgrounds, and so on.

In this embodiment, the depth map and the center weight map are used as the input to the subject detection model, and the subjects closer to the camera are allowed to be detected more easily by using the depth information of the depth map. The subject in the center of the image is allowed to be detected more easily by using a center attention mechanism in which the center weight values are larger and peripheral weight values are smaller in the center weight map. By introducing the depth map to argument the depth feature of the subject and introducing the central weight map to argument the center attention feature of the subject, not only the target subjects in simple scenes can be identified accurately, but also the accuracy of subject identification in complex scenes can be greatly improved. By introducing the depth map, the problem of poor robustness of the conventional target detection methods in detecting various targets in natural images can be solved. The simple scene is a scene with a single subject and low contrast in the background area.

In an embodiment, the subject detection model includes an input layer, an intermediate layer, and an output layer that are sequentially connected.

The inputting the image of the previous frame, the depth map, and the center weight map into the subject detection model includes: applying the image of the previous frame to the input layer of the subject detection model; and applying the depth map and the center weight map to the output layer of the subject detection model.

In this embodiment, applying the depth map and the center weight map to the output layer of the subject detection model can reduce the calculation on the depth map and the center weight map, and by directly applying the depth map and the center weight map to the output result, the accuracy of detection can be improved.

In an embodiment, the method further includes: in response to obtaining the depth map corresponding to the image of the previous frame, performing registration process on the image of the previous frame and the corresponding depth map to obtain registered image of the previous frame and depth map for the same scene; and perform normalization process on pixel values of pixels in the image of the previous frame and pixel values of pixels in the depth map respectively.

Specifically, values of an integer type from 0 to 255 of the pixels in the image of the previous frame are normalized into values of a floating-point type from −1 to 1, and the pixel values of the pixels in the depth map are normalized into floating-point values from 0 to 1. When the depth map cannot be obtained, the simulated depth map in which the depth values are preset values can be automatically generated. The preset values can be floating-point values from 0 to 1.

In this embodiment, the pixel values in the image of the previous frame and the pixel values in the depth map are respectively normalized, thereby reducing the amount of data and save processor resource consumed by the calculation.

In an embodiment, the method further includes: prior to normalizing the pixel values of the pixels in the image of the previous frame and the pixel values of the pixels in the depth map respectively, performing scaling process on the image of the previous frame and the depth map to obtain an image of the previous frame and a depth map of a preset size.

The preset size can be set as required, such as a size of 224*224, 256*256, 648*320, or the like, but is not limited thereto. By reducing the image of the previous frame and depth map to the preset size, data volume can be saved, processing efficiency can be improved, and system resource consumption can be reduced.

In an embodiment, the generating the center weight map corresponding to the image of the previous frame includes generating a center weight map of a preset size corresponding to the image of the previous frame of the preset size.

When the image of the previous frame is scaled down to the preset size, the correspondingly generated center weight map is also needed to be adjusted so that the weight values represented by the center weight map correspond to the pixels in the image of the previous frame.

In an embodiment, a method for determining the target subject includes: in response to detecting multiple subjects in the image of the previous frame, determining the target subject based on at least one of a priority of a category to which each of the subjects belongs, an area occupied by each of the subjects in the image of the previous frame, and a position of each of the subjects in the image of the previous frame.

The category refers to a category into which the subject is classified, such as a portrait, a flower, an animal, a landscape or the like. The position refers to a position in the image of the previous frame and can be expressed in coordinates.

In an embodiment, in response to detecting multiple subjects in the image of the previous frame, the priority of the category to which each of the subjects belongs is obtained, and a subject with a highest priority, a second highest priority or the like is selected as the target subject.

In an embodiment, in response to detecting multiple subjects in the image of the previous frame, the area occupied by each of the subjects in the image of the previous frame is obtained, and the subject with a largest occupied area, a second largest occupied area or the like is selected as the target subject.

In an embodiment, in response to detecting multiple subjects in the image of the previous frame, the position of each of the subjects in the image of the previous frame is obtained, and the subject with a smallest distance between the position of the subject and a center point of the image of the previous frame is selected as the target subject.

In an embodiment, in response to detecting more than one subjects having the same and highest priority of category in the image of the previous frame, the area occupied by each of the more than one subjects having the same and highest priority of category in the image of the previous frame is obtained, and a subject with a largest or second largest occupied area is selected as the target subject.

In an embodiment, in response to detecting more than one subjects having the same and highest priority of category in the image of the previous frame, the position of each of the more than one subjects having the same and highest priority of category in the image of the previous frame is obtained, and a subject with a smallest distance between the position of the subject in the image of the previous frame and a center point of the image of the previous frame is selected as the target subject.

In an embodiment, in response to detecting more than one subjects having the same and highest priority of category in the image of the previous frame, the area occupied by each of the more than one subjects having the same and highest priority of category in the image of the previous frame is obtained, and in response to detecting more than one subjects which occupy the same area in the image of the previous frame, the position of each of the more than one subjects occupying the same area in the image of the previous frame are obtained, and a subject with a smallest distance between the position of the subject in the image of the previous frame and a center point of the image of the previous frame is selected as the target subject.

When there are multiple subjects in the image of the previous frame, the priority of the category to which each of the multiple subjects belongs, the area occupied by each of the multiple subjects in the image of the previous frame, and the position of each of the multiple subjects in the image of the previous frame can be obtained, and the subjects can be filtered based on three dimensions of the priority, the area and the position. An order of the priority, the area and the position for filtering can be set as needed and is not limited herein.

In the above embodiments, when there are multiple subjects in the image of the previous frame, the target subject is selected and determined based on at least one of the priority of the category to which the subject belongs, the area, and the position so that the target subject can be accurately determined.

In an embodiment, the method for determining the target subject further includes: in response to detecting that there are multiple subjects in the image of the previous frame and the multiple subjects are multiple human faces, determining whether the multiple human faces are on a same plane;

in response to determining that the multiple human faces are on the same plane, using the multiple faces as target subjects; and in response to determining that the multiple human faces are on different planes, a human face with a largest area is selected as the target subject.

Specifically, the depth information of each of the faces can be obtained, and it is determined whether the multiple faces are on the same plane by determining whether the depth information of each of the faces is the same. When the depth information is the same, the multiple human faces are on the same plane, and when the depth information is different, they are not on the same plane. The depth information of a human face may be represented by an average value, a median value, or a weighted value of the depth information of each of the pixel points in a region where the human face is located. The depth information of the face may also be calculated by using each of the pixels of the region where the face is located according to a preset function. The preset function may be a linear function, an exponential function, a power function, or the like.

In an embodiment, a method for training the subject detection model includes: obtaining a visible light image, a depth map, and a labeled subject mask map for a same scene; generating a center weight map corresponding to the visible light image, where weight values represented by the center weight map gradually decrease from a center to edges of the center weight map; and training the subject detection model containing an initial network weight by applying the visible light image to an input layer of the subject detection model containing the initial network weight, applying the depth map and the center weight map to an output layer of the subject detection model containing the initial network weight, and using the labeled subject mask map as a ground truth of an output from the subject detection model containing the initial network weight to obtain a target network weight of the subject detection model.

The visible light image, the depth map, and the corresponding masked subject mask map can be collected for the same scene. Semantic labeling can be performed on the visible light image and the depth map so that the subjects therein are labeled. A large number of visible light images can be collected, and then fusion is performed based on foreground target images in a Common Objects in COntext (COCO) dataset and simple background images to obtain a large number of images with solid-color backgrounds or simple backgrounds, which are used as the visible light images for training. The COCO dataset contains a large number of foreground targets.

The network structure of the subject detection model employs a Mobile-Unet-based architecture, and a bridge between layers is added in a decoder part, so that high-level semantic features are more fully transferred during up-sampling. The center weight map is applied to the output layer of the subject detection model, and by introducing this central attention mechanism, the object in the center of the screen is allowed to be detected as the subject more easily.

The network structure of the subject detection model includes an input layer, a convolution layer, a pooling layer, a bilinear up-sampling layer, a convolution feature concatenation layer (concat+conv), an output layer, etc. A deconvolution feature addition (deconvolution+add) operation is performed to bridge between the bilinear up-sampling layer and the convolutional feature concatenation layer, so that high-level semantic features are more fully transferred during up-sampling. The convolutional layer, the pooling layer, the bilinear up-sampling layer, and the convolutional feature concatenation layer can be the intermediate layers of the subject detection model.

The initial network weight refers to an initial weight of each layer of an initialized deep learning network model. The target network weight refers to a weight of each layer of the trained deep learning network model which is capable of detecting subjects in the image. The target network weight can be obtained by preset times of training. A loss function of the deep learning network model can also be set, and when the value of the loss function obtained from training is less than a loss threshold, the current network weight of the subject detection model is used as the target network weight.

Figure 4:
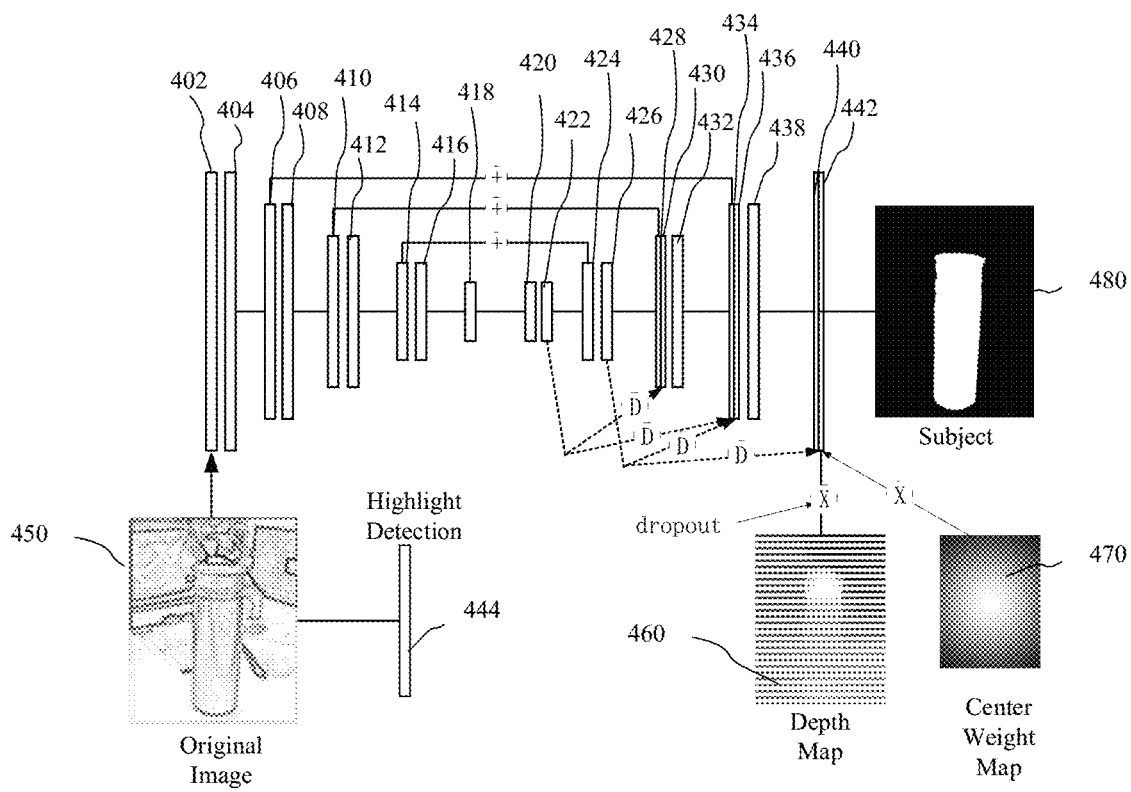
FIG. 4 is a schematic diagram of a network structure of a subject detection model in an embodiment.

FIG. 4 is a schematic diagram of a network structure of a subject detection model in an embodiment. As shown in FIG. 4, the network structure of the subject detection model includes a convolutional layer 402, a pooling layer 404, a convolutional layer 406, a pooling layer 408, a convolutional layer 410, a pooling layer 412, a convolutional layer 414, a pooling layer 416, a convolution layer 418, a convolution layer 420, a bilinear up-sampling layer 422, a convolution layer 424, a bilinear up-sampling layer 426, a convolution layer 428, a convolution feature concatenation layer 430, a bilinear up-sampling layer 432, a convolutional layer 434, a convolutional feature concatenation layer 436, a bilinear up-sampling layer 438, a convolutional layer 440, a convolutional feature concatenation layer 442, etc. The convolutional layer 402 serves as the input layer of the subject detection model, and the convolutional feature concatenation layer 442 serves as the output layer of the subject detection model. The network structure of the subject detection model in this embodiment is merely an example, and is not intended to be any limitation on the present disclosure. It can be understood that there may be multiple convolutional layers, pooling layers, bilinear interpolation layers, and convolutional feature concatenation layers provided in the network structure of the subject detection model, as needed.

A encoding part of the subject detection model includes the convolution layer 402, the pooling layer 404, the convolution layer 406, the pooling layer 408, the convolution layer 410, the pooling layer 412, the convolution layer 414, the pooling layer 416, and the convolution layer 418, and a decoding part includes the convolution layer 420, the bilinear up-sampling layer 422, the convolution layer 424, the bilinear up-sampling layer 426, the convolution layer 428, the convolution feature connection layer 430, the bilinear up-sampling layer 432, the convolution layer 434, the convolutional feature concatenation layer 436, the bilinear up-sampling layer 438, the convolutional layer 440, and the convolutional feature concatenation layer 442. The convolution layer 406 and the convolution layer 434 are concatenated, the convolution layer 410 and the convolution layer 428 are concatenated, and the convolution layer 414 and the convolution layer 424 are concatenated. The bilinear up-sampling layer 422 and the convolutional feature concatenation layer 430 are bridged by using a deconvolution feature addition. The bilinear up-sampling layer 432 and the convolutional feature concatenation layer 436 are bridged by using the deconvolution feature addition. The bilinear up-sampling layer 438 and the convolutional feature concatenation layer 442 are bridged by using the deconvolution feature addition.

An original image 450 such as a visible light image is input to the convolution layer 402 of the subject detection model, a depth map 460 is applied to the convolution feature connection layer 442 of the subject detection model, and a center weight map 470 is applied to the convolution feature connection layer 442 of the subject detection model. The depth map 460 and the center weight map 470 are respectively input to the convolution feature connection layer 442 as multiplication factors. The original image 450, the depth map 460, and the center weight map 470 are input to the subject detection model, and a confidence map 480 including the subject is output.

During the training process of the subject detection model, a dropout rate of a preset value is used for the depth map. The preset value can be 50%. By introducing the dropout rate in a form of a probability during the training of the depth map, the subject detection model can fully mine the information of the depth map, and even if the depth map cannot be obtained for the subject detection model, accurate results can still be output. The dropout method used for the input to the depth map allows that the subject detection model is more robust to the depth map, and the subject area can be accurately segmented even if there is no depth map.

In addition, since the capturing and calculation of the depth maps are time-consuming and the depth maps may be difficult to be obtained during normal shooting of the electronic device, the dropout probability of 50% is set for the depth map during the training, which ensures that the subject detection model can still perform detection normally without depth information.

A highlight detection layer 444 is used to perform highlight detection on the original image 450 to recognize a highlight area in the original image. Adaptive threshold filtering process is performed on the subject area confidence map output by the subject detection model to obtain a binary mask map. The binary mask map is subjected to morphological processing and guided filtering, and a subject mask map is obtained. Differential processing is performed on the subject mask map and the original image including the highlight area, and the highlight area is removed from the subject mask map, thereby obtaining a subject with the highlight removed. The subject area confidence map is a map of confidences distributed from 0 to 1, and contains relatively more noise points. The noise points of low confidences, or small block areas of high confidences which are aggregated together can be filtered by the adaptive confidence threshold filtering so as to obtain the binary mask map. Performing morphological process on the binary mask map can further reduce the noise, and performing the guided filtering can smooth the edges. It can be understood that the subject area confidence map may be a subject mask map including noise points.

In this embodiment, the depth map is used as a feature to argument the output of the network, and the depth map is not directly input to the network of the subject detection model. A dual deep learning network structure may be additionally designed in which one deep learning network structure is used to process the depth map and the other deep learning network structure is used to process the RGB image, and then the convolution feature concatenation is performed on outputs of the two deep learning network structures before outputting.

In an embodiment, the method for training the subject detection model includes: obtaining a visible light image and a labeled subject mask map for a same scene; generating a center weight map corresponding to the visible light image, where weight values represented by the center weight map gradually decrease from a center to edges of the center weight map; and training the subject detection model containing an initial network weight by applying the visible light image to an input layer of the subject detection model containing the initial network weight, applying the center weight map to an output layer of the subject detection model containing the initial network weight, and using the labeled subject mask map as a ground truth of an output from the subject detection model containing the initial network weight to obtain a target network weight of the subject detection model.

In the training of the present embodiment, the visible light image and the center weight map are used, that is, the depth map is not introduced in the output layer part of the network structure of the subject detection model in FIG. 4. The visible light image is applied to the convolutional layer 402 and the center weight map 470 is applied to the convolutional feature connection layer 442 of the subject detection model.

A process of recognizing a subject in an image by using a trained subject detection model includes: loading the subject detection model, initializing a target network weight of the subject detection model; obtaining a RGB image of a previous frame and a depth map for a current scene, performing registration on the RGB image and the depth map based on camera calibration parameters and reducing the RGB image and the depth map to a preset size; preprocessing the RGB map and the depth map, normalizing pixel values of a integer type of the RGB map from 0 to 255 to values of a floating-point type from −1 to 1, normalizing values of a integer type of the depth map to values of a floating-point type from 0 to 1; generating a center weight map corresponding to the RGB map by using a two-dimensional Gaussian function, where weight values represented by the center weight map gradually decrease from a center to edges center weight map; the processed RGB image, depth map, and center weight map are input into the subject detection model to obtain a subject area confidence map; performing adaptive threshold filtering on the subject area confidence map to filter out the pixels confidences of which are lower than a confidence threshold to obtain a binary mask map; perform morphological processing, guided filtering, and expansion and corrosion operations on the binary mask map to obtain a subject mask map with edges extracted. The subject mask map records a target subject and a corresponding target area obtained by image recognition.

Figure 5:
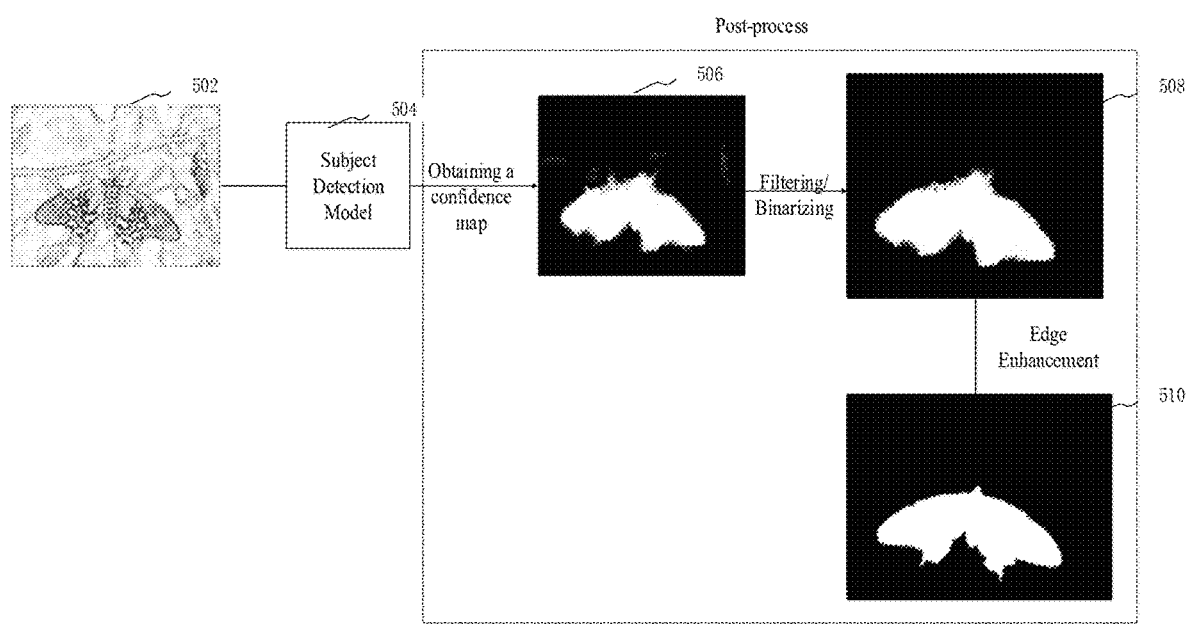
FIG. 5 is a schematic diagram of a subject detection process in an embodiment.

FIG. 5 is a schematic diagram of a subject detection process in an embodiment. As shown in FIG. 5, there is a butterfly in a RGB image 502. The RGB image is input into the subject detection model 504 and a subject area confidence map 506 is obtained. The subject area confidence map 506 is filtered and binarized to obtain a binary mask map 508. The morphological processing and guided filtering are performed on the binary mask map 508 for edge enhancement, and a subject mask map 510 is obtained. The subject mask map 510 records a target subject and a corresponding target area obtained by the image recognition.

In an embodiment, the focusing method further includes, in response to acquiring the image of the current frame:
  detecting whether there is a touch instruction on a screen;
  in response to detecting the touch instruction on the screen, obtaining a touch area where the touch instruction is generated, and performing auto focusing by using the touch area as a focusing area of the image of the current frame;
  in response to detecting no touch instruction on the screen, performing the step of performing the auto focusing by using the target area in the image of the previous frame as the focusing area of the image of the current frame.

The electronic device may be configured with a touch screen, and the touch screen may detect a touch operation on the screen and the touch instruction is generated. A processor of the electronic device detects that the touch instruction is generated based on the touch operation on the screen, captures the touch area for which the touch instruction is generated, and uses the touch area as the target area. When no touch instruction is detected, the target area corresponding to the target subject in the image of the previous frame is used as the focusing area of the image of the current frame.

In this embodiment, when the touch instruction is detected, the focusing is performed by using the touch area for which the touch instruction is generated as the target area so that an area selected by a user can be used as the focusing area, which satisfies the user's requirement and improves the accuracy of the focusing.

In an embodiment, performing the auto focusing by using the target area in the image of the previous frame as the focusing area in the image of the current frame includes: using the target area as the focusing area of the image of the current frame; obtaining a phase difference of the target area in the image of the current frame, and determining a defocus value from a pre-calibrated correspondence between phase differences and focus values based on the phase difference; controlling the lens to move based on the defocus value; obtaining a focus value of a corresponding target area in an image of a next frame; in response to detecting that the focus value of the corresponding target area in the image of the next frame is not a FV peak, controlling the lens to continue moving; and in response to detecting that the focus value of the corresponding target area in the image of the next frame is the FV peak, completing the focusing.

Specifically, when employing Phase Detection Auto Focusing (PDAF), the phase difference of each of the pixels of the corresponding target area in the image of the current frame is obtained, and the phase difference of the target area is obtained by summing up the phase difference of each pixel or in other ways based on the phase difference of each pixel. The correspondence between the phase differences and the focus values is calibrated in advance. When the phase difference is zero, the corresponding focus value is the FV peak, and the current focus value can be determined according to the correspondence between the phase differences and the focus values. The defocus value can be obtained based on the current focus value and the FV peak, and is converted into a moving direction and a moving distance. The lens is controlled to move the corresponding distance in the moving direction. The moving distance and the moving direction are transmitted to the actuator 116 which controls the lens to move according to the moving distance and the moving direction so as to achieve a coarse search.

The imaging device 110 of the electronic device acquires the image of the next frame and transmits it to the control logic 150 which calculates the focus value of the corresponding target area in the image of the next frame.

In response to detecting by the control logic 150 that the focus value of the corresponding target area in the image of the next frame is not the FV peak, the lens is controlled to continue moving, a focus value of a corresponding target area in an image of a frame next to the next frame is obtained, and it is determined again whether this focus value is the FV peak.

In response to detecting by the control logic 150 that the focus value of the corresponding target area in the image of the next frame is the FV peak, the current focusing is completed.

In this embodiment, by using the PDAF, the defocus value can be calculated, the lens can be moved to near the FV peak in one time, and then the FV peak is finely searched, thereby improving focusing efficiency and saving time of focusing. Because the target subject and the corresponding target area are recognized and the target area is used as the focusing area, the focus process will not be affected by ambient environment, which improves the accuracy of the focusing.

In an embodiment, in response to detecting by the control logic 150 that the focus value of the corresponding target area in the image of the next frame is not the FV peak, controlling the lens to continue moving includes: in response to detecting that the focus value of the corresponding target area in the image of the next frame is not the FV peak, controlling the lens to continue moving in a preset step, where the preset step is smaller than the defocus value.

Specifically, the preset step size is set as required. In the fine search, the lens is gradually moved in the preset step.

In an embodiment, the focusing method further includes: acquiring, frame by frame, an target image of each of frames subsequent to the current frame; when a difference of the number of the frames between the target image and the image of the current frame is less than or equal to a threshold number of frames, using a target tracking algorithm to track a target subject in the target image to obtain the target subject and a corresponding target area in the target image; and when the difference of the number of the frames between the target image and the image of the current frame is greater than the threshold number of frames, performing the subject detection on the target image to obtain the target subject and the corresponding target region in the target image. The threshold number of the frames can be set in advance.

Specifically, the target tracking algorithm may be a Tracking by Detection algorithm, a Kernelized Correlation Filter based algorithm, or the like. After the subject in the image of the current frame is recognized, it continues to acquire the target images frame by frame and obtain the difference of the number of frames between each of the target images and the image of the current frame. When the difference of the number of frames is less than or equal to the threshold number of the frames, the target tracking algorithm can be used to track the target subject, and an area in the target image in which the target subject obtained by tracking is located is used as the target area in the target image. When the difference of the number of frames is greater than the threshold number of frames, the subject detection is needed to be performed on the target image to obtain the target subject in the target image and the target area in which the target subject is located. The target area is used as the focusing area to assist the auto focusing, which can avoid lost or inaccurate tracking of the target subject caused in a case that there is a large number of frames to be tracked.

Figure 6:
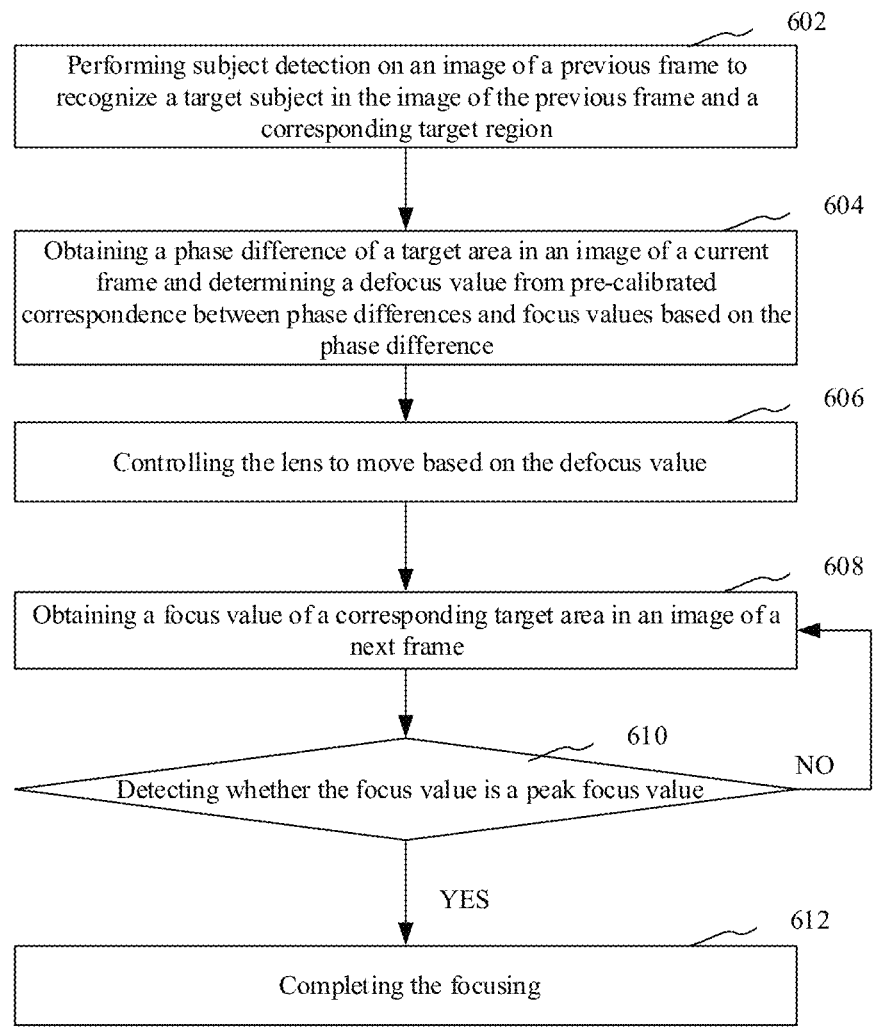
FIG. 6 is a flowchart of a focusing method in another embodiment.

FIG. 6 is a flowchart of a focusing method in another embodiment. As shown in FIG. 6, the focusing method includes the following steps.

In step 602, subject detection is performed on an image of a previous frame to recognize a target subject and a corresponding target region in the image of the previous frame.

In step 604, a phase difference of a target area in an image of a current frame is obtained, and a defocus value is determined from pre-calibrated correspondence between phase differences and focus values based on the phase difference.

In step 606, the lens is controlled to move based on the defocus value.

The lens is controlled to move based on the defocus value so as to perform the coarse search.

In step 608, a focus value of a corresponding target area in an image of a next frame is obtained.

In step 610, it is detected whether the focus value is a FV peak, if so, the process proceeds to step 612, and if not, the lens is controlled to move and the process returns to step 608.

In step 612, the focusing is completed.

In the focusing method in this embodiment, the target area where the target subject is located in one frame image in recognized, the corresponding target area in the image of the next frame is obtained and determined as the focusing area of the image of the next frame, the phase difference of the focusing area is calculated, the defocus value is determined based on the phase difference value, and the lens is controlled to move based on the defocus value to achieve the coarse search for focusing. The focus value in the corresponding target area in the image of the frame next to the next frame is obtained, and it is determined whether the focus value is the FV peak. If it is determined that it is the FV peak, it indicates that the focusing is completed. If the focus value is not the FV peak, the lens is controlled to move and it continues searching for the FV peak until the focus value reaches the FV peak, and the focusing is completed. Since the target subject in the image is recognized and the target area is determined in the focusing, the focusing will not be affected by other areas and the accuracy of the focusing is improved.

It is to be noted that although the focusing method is described in the case of the PDAF in the above embodiments, the focusing method of the present disclosure can be applied to other focusing approaches.

Figure 7:
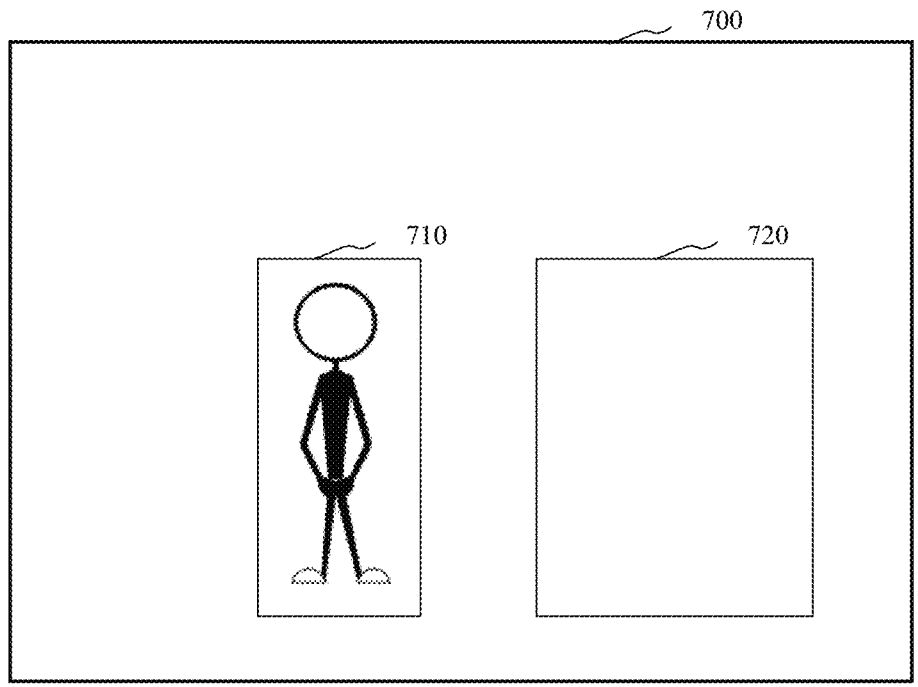
FIG. 7 is a schematic diagram of an application scenario of a focusing method in an embodiment.

FIG. 7 is a schematic diagram of an application scenario of a focusing method in an embodiment. As shown in FIG. 7, the camera of the electronic device captures a scene 700. The scene 700 includes a first area 710 and a second area 720. The first area 710 contains a portrait, and the second area 720 contains no portrait. A brightness of the second region 720 is greater than that of the first area 710. If the camera performs auto focusing directly, since the brightness of the second area 720 is greater than that of the first area 710, the focusing will be performed by using the second area 720 as the focusing area. With the focusing method in the embodiments of the present disclosure, because the target subject in the image of the previous frame has been detected as a portrait first, a target area corresponding to the target subject is output, and the target area is used as the focusing area of the image of the current frame, the corresponding target area of the target subject, that is, the portrait, in the image of the current frame is determined, and the area where the portrait is located is used as the focusing area of the image of the current frame. That is, the first area 710 is used as the focusing area, and the second area 720 will not be used as the focus region despite the brightness of the second area 720 is greater than that of the first area 710, otherwise it will result in an inaccurate focusing. Thus the accuracy of focusing is improved.

It should be understood that although the steps in the flowcharts of FIG. 2 and FIG. 6 are sequentially shown in directions of arrows, these steps are not necessarily performed sequentially in the order indicated by the arrows. Unless explicitly specified herein, the order of these steps is not strictly limited, and these steps can be performed in other orders. Moreover, at least part of the steps in FIG. 2 and FIG. 6 may include multiple sub-steps or multiple stages which are not necessarily performed at the same time and may be performed at different times. These sub-steps or stages are not necessarily performed sequentially, and may be performed in turn or alternately with other steps or at least part of sub-steps or stages of the other steps.

Figure 8:
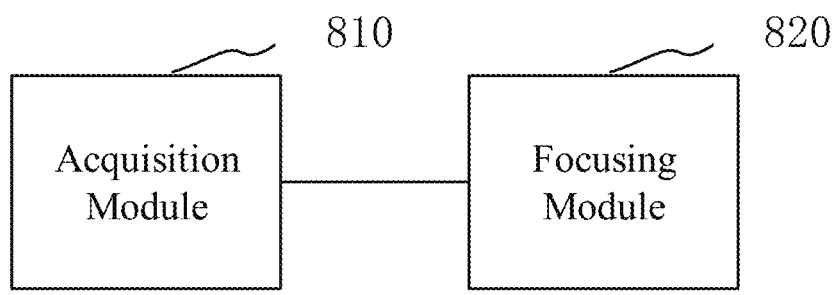
FIG. 8 is a structural block diagram of a focusing device in an embodiment.

FIG. 8 is a structural block diagram of a focusing device in an embodiment. As shown in FIG. 8, the focusing device includes an acquisition module 810 and a focusing module 820.

The acquisition module 810 is configured to acquire an image of a current frame.

The focusing module 820 is configured to perform auto focusing by using a target area in an image of a previous frame as a focusing area in the image of the current frame, the image of the previous frame is an image of a preceding frame adjacent to the current frame, the target area in the image of the previous frame is an area where a target subject is located, the target subject is obtained by inputting the image of the previous frame into a subject detection model and performing subject detection, and the subject detection model is a model trained in advance based on at least visible light images, center weight maps and corresponding labeled subjects for a same scene.

The subject detection model is trained in advance based on the visible light images, the center weight maps and the corresponding labeled subjects for a same scene, or trained in advance based on the visible light images, the center weight maps, depth maps, and the corresponding labeled subjects for the same scene.

Figure 9:
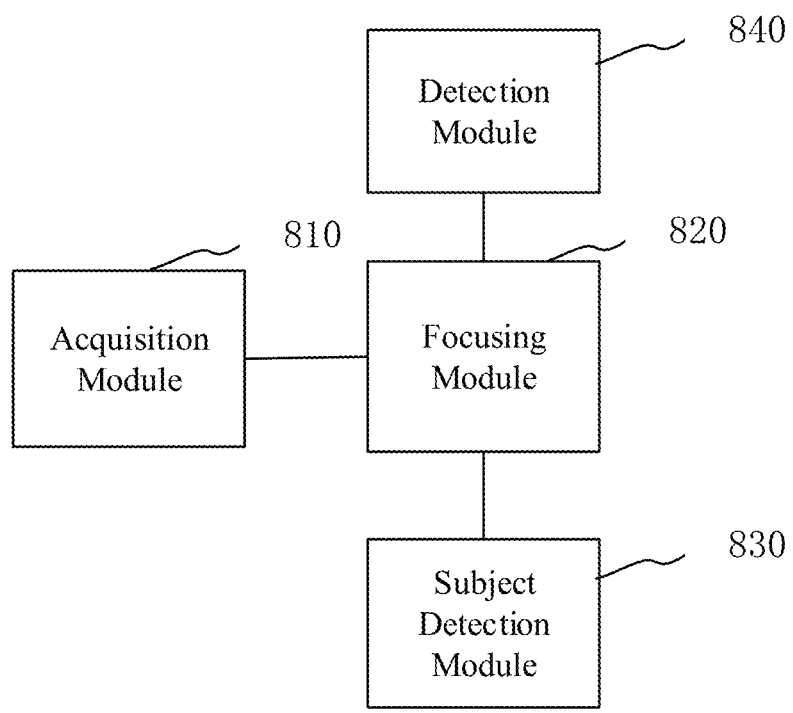
FIG. 9 is a structural block diagram of a focusing device in another embodiment.

In an embodiment, the above focusing device further includes a subject detection module 830, as shown in FIG. 9. The subject detection module 830 is configured to generate a center weight map corresponding to the image of the previous frame; and obtain the target subject in the image of the previous frame by inputting the image of the previous frame and the center weight map into the subject detection model which is trained in advance based on the visible light images, the center weight maps, and the corresponding labeled subjects for the same scene.

In an embodiment, the subject detection model includes an input layer, an intermediate layers, and an output layer that are sequentially connected.

The subject detection module 830 is further configured to apply the image of the previous frame to the input layer of the subject detection model, and apply the center weight map to the output layer of the subject detection model.

In an embodiment, the subject detection module 830 is further configured to obtain a depth map corresponding to the image of the previous frame; generate a center weight map corresponding to the image of the previous frame; and input the image of the previous frame, the depth map and the center weight map into the subject detection model to obtain the target subject in the image of the previous frame, where the subject detection model is trained in advance based on the visible light images, the depth maps, the center weight maps, and the corresponding labeled subjects for the same scene.

In an embodiment, the subject detection model includes an input layer, an intermediate layer, and an output layer that are sequentially connected.

The subject detection module 830 is further configured to apply the image of the previous frame to the input layer of the subject detection model, and apply the depth map and the center weight map to the output layer of the subject detection model.

In an embodiment, the subject detection module 830 is further configured to, in response to detecting multiple subjects in the image of the previous frame, determine the target subject based on at least one of a priority of a category to which each of the subjects belongs, an area occupied by each of the subjects in the image of the previous frame, and a position of each of the subjects in the image of the previous frame.

In an embodiment, the subject detection module 830 is further configured to, in response to detecting multiple subjects in the image of the previous frame, obtain the priority of the category to which each of the multiple subjects belongs, and select a subject with a highest priority as the target subject.

In an embodiment, the subject detection module 830 is further configured to, in response to detecting more than one subjects having the highest priority, obtain a distance between a position of each of the subjects having the highest priority in the image of the previous frame and a center point of the image of the previous frame, and select a subject with a smallest distance as the target subject.

In an embodiment, the subject detection module 830 is further configured to, in response to detecting more than one subjects having the highest priority, obtain an area occupied by each of the subjects having the highest priority in the previous frame, and select a subject with a largest occupied area as the target subject.

In an embodiment, as shown in FIG. 9, the focusing device further includes an instruction detection module 840. The instruction detection module 840 is configured to detect whether there is a touch instruction on a screen in response to acquiring the image of the current frame by the acquisition module 810.

The focusing module 820 is further configured to, in response to detecting the touch instruction on the screen by the instruction detection module 840, obtain a touch area for which the touch instruction is generated, and perform auto focusing by using the touch area as a focusing area of the image of the current frame.

The focusing module 820 is further configured to perform auto focusing by using the target area as a focusing area of the image of the current frame in response to that no touch instruction on the screen is detected by the instruction detection module 840.

In an embodiment, the focusing module 820 is further configured to use the target area as the focusing area of the image of the current frame; obtain a phase difference of the target area in the image of the current frame, and determine a defocus value from pre-calibrated correspondence between phase differences and focus values based on the phase difference; control the lens to move based on the defocus value; and obtain a focus value of a corresponding target area in an image of a next frame; in response to detecting that the focus value of the corresponding target area in the image of the next frame is not a FV peak, control the lens to continue moving; and in response to detecting that the focus value of the corresponding target area in the image of the next frame is the FV peak, complete the focusing.

In an embodiment, the focusing module 820 is further configured to control the lens to continue moving in a preset step in response to detecting that the focus value of the corresponding target area in the image of the next frame is not the FV peak, where the preset step is smaller than the defocus value.

Figure 10:
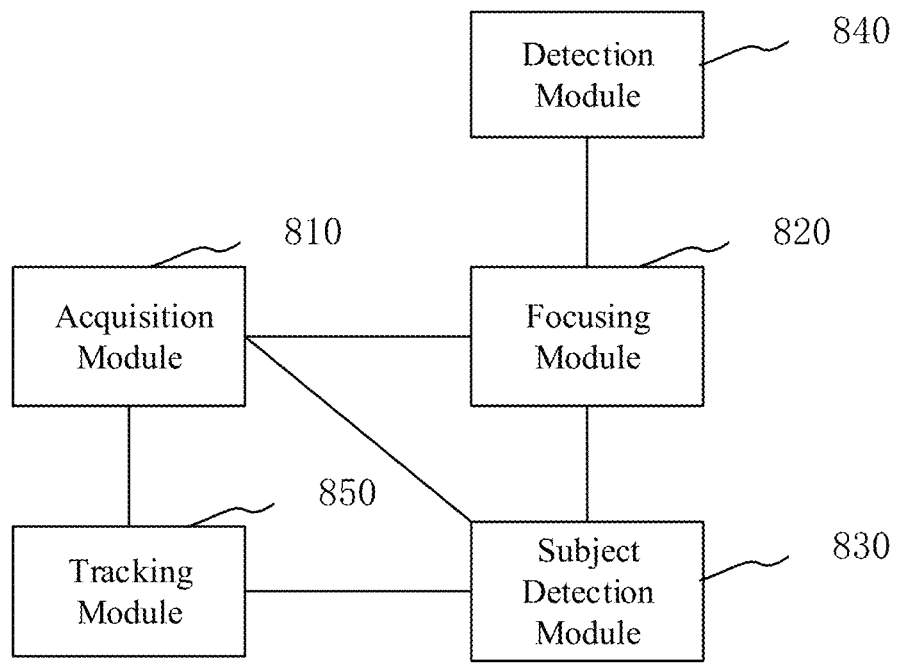
FIG. 10 is a structural block diagram of a focusing device in another embodiment.

In an embodiment, as shown in FIG. 10, the focusing device further includes a tracking module 850.

The acquisition module 810 is further configured to acquire, frame by frame, a target image of each of frames subsequent to the current frame.

The tracking module 850 is configured to track the target subject in the target image by using a target tracking algorithm when a difference of the number of frames between the target image and the image of the current frame is less than or equal to a threshold number of frames.

The subject detection module 830 is configured to perform subject detection on the target image to obtain a target subject and a corresponding target area in the target image when a difference of the number of frames between the target image and the image of the current frame is greater than the threshold number of frames.

The division of the modules in the above focusing device is only for illustration. In other embodiments, the focusing device may be divided into different modules as needed to complete all or part of the functions of the above focusing device.

Figure 11:
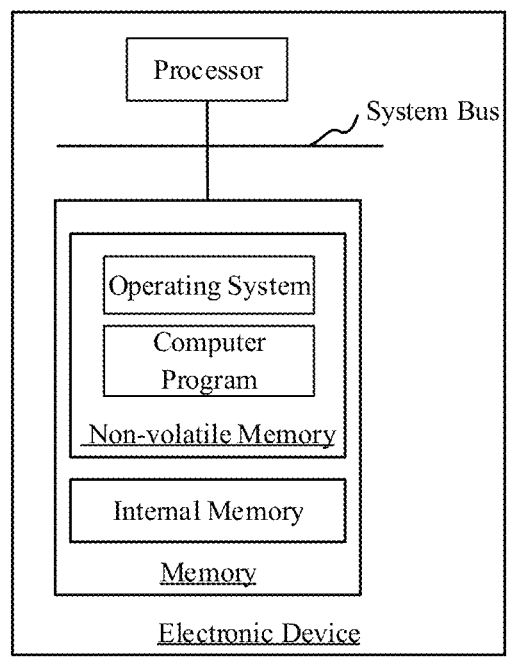
FIG. 11 is a block diagram of an internal structure of an electronic device in another embodiment.

FIG. 11 is a schematic diagram of an internal structure of an electronic device in an embodiment. As shown in FIG. 11, the electronic device includes a processor and a memory which are connected via a system bus. The processor is configured to provide computing and control capabilities to support the operation of the entire electronic device. The memory may include a non-volatile storage medium and an internal memory. The non-volatile storage medium stores an operating system and computer programs. The computer programs can be executed by the processor to implement the focusing method provided in the foregoing embodiments. The internal memory provides a cached operating environment for operating system and computer programs in a non-volatile storage medium. The electronic device may be a mobile phone, a tablet computer, a personal digital assistant, a wearable device or the like.

The implementation of each of the modules of the focusing device provided in the embodiments of the present disclosure may be in a form of a computer program. The computer program can be run on a terminal or a server. The program modules constituted by the computer program can be stored in the memory of the terminal or the server. When the computer program is executed by the processor, the steps of the method described in the embodiments of the present disclosure are implemented.

An embodiment of the present disclosure further provides a computer-readable storage medium. One or more non-volatile computer-readable storage mediums contain computer-executable instructions that, when executed by one or more processors, cause the processors to perform the steps of the focusing method.

A computer program product contains instructions that, when run on a computer, cause the computer to perform the focusing method.

Any reference to memory, storage, database, or other media used in embodiments of the present disclosure may include non-volatile and/or volatile memory. Suitable non-volatile memory may include read-only memory (ROM), programmable ROM (PROM), electrically programmable ROM (EPROM), electrically erasable programmable ROM (EEPROM), or flash memory. The volatile memory may include random access memory (RAM), which is used as external cache memory. By way of illustration and not limitation, RAM is available in various forms, such as static RAM (SRAM), dynamic RAM (DRAM), synchronous DRAM (SDRAM), dual data rate SDRAM (DDR SDRAM), enhanced SDRAM (ESDRAM), synchronous Link (Synchlink) DRAM (SLDRAM), memory bus (Rambus) direct RAM (RDRAM), direct memory bus dynamic RAM (DRDRAM), and memory bus dynamic RAM (RDRAM).

The above-mentioned embodiments only provide several implementations of the present disclosure, and the descriptions thereof are relatively specific and detailed, but they should not be understood as limiting the scope of the present disclosure. It should be noted that, for those of ordinary skill in the art, modifications and improvements which fall within the protection scope of the present disclosure can be made without departing from the concept of the present disclosure. Therefore, the appended claims shall prevail for the protection scope of the present disclosure.

What is claimed is:

1. A focusing method, comprising:
   acquiring an image of a current frame; and
   performing auto focusing by using a target area in an image of a previous frame as a focusing area in the image of the current frame;
   wherein the image of the previous frame is an image of a preceding frame adjacent to the current frame, the target area in the image of the previous frame is an area where a target subject is located, the target subject is obtained by inputting the image of the previous frame into a subject detection model and performing subject detection, the subject detection model is a model trained in advance based on at least visible light images, center weight maps and corresponding labeled subjects for a same scene, and the subject detection model comprises an input layer, an intermediate layer, and an output layer that are sequentially connected;
   wherein one of the following:
      the subject detection model is trained in advance based on the visible light images, the center weight maps and the corresponding labeled subjects for a same scene, and the target subject in the image of the previous frame is obtained by:
         generating a center weight map corresponding to the image of the previous frame;
         applying the image of the previous frame to the input layer of the subject detection model; and
         applying the center weight map to the output layer of the subject detection model; and
      the subject detection model is trained in advance based on the visible light images, depth maps, the center weight maps, and the corresponding labeled subjects for the same scene, and the target subject in the image of the previous frame is obtained by:
         obtaining a depth map corresponding to the image of the previous frame;
         generating a center weight map corresponding to the image of the previous frame;
         applying the image of the previous frame to the input layer of the subject detection model; and
         applying the depth map and the center weight map to the output layer of the subject detection model.

2. The method of claim 1, wherein the performing subject detection comprises:
   in response to detecting multiple subjects in the image of the previous frame, determining the target subject from the multiple subjects based on at least one of a priority of a category to which each of the multiple subjects belongs, an area occupied by each of the multiple subjects in the image of the previous frame, and a position of each of the multiple subjects in the image of the previous frame.

3. The method of claim 2, wherein the performing subject detection further comprises:
   in response to detecting the multiple subjects in the image of the previous frame, obtaining the priority of the category to which each of the multiple subjects belongs, and selecting a subject with a highest priority as the target subject.

4. The method of claim 3, wherein the performing subject detection further comprises:
   in response to detecting more than one subjects having the highest priority in the image of the previous frame, obtaining a distance between the position of each of the more than one subject having the highest priority in the image of the previous frame and a center point of the image of the previous frame, and selecting a subject with a smallest distance as the target subject; or
   in response to detecting more than one subjects having the highest priority in the image of the previous frame, obtaining the area occupied by each of the more than one subjects having the highest priority in the image of the previous frame, and selecting a subject with a largest occupied area as the target subject.

5. The method of claim 1, wherein the method further comprises, in response to acquiring the image of the current frame:
   detecting whether there is a touch instruction on a screen;
   in response to detecting the touch instruction on the screen, obtaining a touch area for which the touch instruction is generated, and performing auto focusing by using the touch area as the focusing area of the image of the current frame; and
   in response to detecting no touch instruction on the screen, performing the step of performing the auto focusing by using the target area in the image of the previous frame as the focusing area of the image of the current frame.

6. The method of claim 1, wherein performing the auto focusing by using the target area in the image of the previous frame as the focusing area in the image of the current frame comprises:
   using the target area as the focusing area of the image of the current frame, obtaining a phase difference of the target area in the image of the current frame, and determining a defocus value from a pre-calibrated correspondence between phase differences and focus values based on the phase difference;
   controlling a lens to move based on the defocus value;
   obtaining a focus value of a corresponding target area in an image of a next frame;
   controlling the lens to continue moving in response to detecting that the focus value of the corresponding target area in the image of the next frame is not a focus value peak; and
   completing the focusing in response to detecting that the focus value of the corresponding target area in the image of the next frame is the focus value peak.

7. The method of claim 6, wherein the controlling the lens to continue moving in response to detecting that the focus value of the corresponding target area in the image of the next frame is not a focus value peak comprises:
   controlling the lens to continue moving in a preset step in response to detecting that the focus value of the corresponding target area in the image of the next frame is not the focus value peak, wherein the preset step is smaller than the defocus value.

8. The method of claim 1, further comprising:
   acquiring, frame by frame, an target image of each of frames subsequent to the current frame;
   using a target tracking algorithm to track a target subject in the target image to obtain a corresponding target area in the target image when a difference of the number of the frames between the target image and the image of the current frame is less than or equal to a threshold number of frames; and performing subject detection on the target image to obtain the target subject and the corresponding target area in the target image when the difference of the number of the frames between the target image and the image of the current frame is greater than the threshold number of frames.

9. A non-transitory computer-readable storage medium having stored thereon computer program that, when executed by a processor, causes the processor to perform the focusing method of claim 1.

10. An electronic device, comprising:
a processor; and
a memory for storing instructions executable by the processor;
wherein the processor executes the instructions to perform a focusing method, the method comprising:
  acquiring an image of a current frame; and
  performing auto focusing by using a target area of a target subject in the image of a previous frame as a focusing area in the image of the current frame,
  wherein the image of the previous frame is an image of a preceding frame adjacent to the current frame, the target area in the image of the previous frame is an area where a target subject is located, the target subject is obtained by inputting the image of the previous frame into a subject detection model and performing subject detection, the subject detection model is a model trained in advance based on at least visible light images, center weight maps and corresponding labeled subjects for a same scene, and the subject detection model comprises an input layer, an intermediate layer, and an output layer that are sequentially connected;
  wherein one of the following:
    the subject detection model is trained in advance based on the visible light images, the center weight maps and the corresponding labeled subjects for a same scene, and the target subject in the image of the previous frame is obtained by:
      generating a center weight map corresponding to the image of the previous frame;
      applying the image of the previous frame to the input layer of the subject detection model; and
      applying the center weight map to the output layer of the subject detection model; and
    the subject detection model is trained in advance based on the visible light images, depth maps, the center weight maps, and the corresponding labeled subjects for the same scene, and the target subject in the image of the previous frame is obtained by:
      obtaining a depth map corresponding to the image of the previous frame;
      generating a center weight map corresponding to the image of the previous frame;
      applying the image of the previous frame to the input layer of the subject detection model; and
      applying the depth map and the center weight map to the output layer of the subject detection model.

11. The electronic device of claim 10, wherein performing the auto focusing by using the target area in the image of the previous frame as the focusing area in the image of the current frame comprises:
using the target area as the focusing area of the image of the current frame, obtaining a phase difference of the target area in the image of the current frame, and determining a defocus value from a pre-calibrated correspondence between phase differences and focus values based on the phase difference;
controlling a lens to move based on the defocus value;
obtaining a focus value of a corresponding target area in an image of a next frame;
controlling the lens to continue moving in response to detecting that the focus value of the corresponding target area in the image of the next frame is not a focus value peak; and
completing the focusing in response to detecting that the focus value of the corresponding target area in the image of the next frame is the focus value peak.

* * * * *